United States Patent
Bolton et al.

(10) Patent No.: US 10,163,119 B1
(45) Date of Patent: Dec. 25, 2018

(54) SYSTEMS AND METHODS FOR SYNCHRONIZED DELIVERY

(71) Applicant: UNITED PARCEL SERVICE OF AMERICA, INC., Atlanta, GA (US)

(72) Inventors: Chris Bolton, Woodstock, GA (US); Steven D. Brill, Alpharetta, GA (US); Matthew Collins, Milton, GA (US); Anthony Creasy, Hayesville, NC (US); Andrew Dotterweich, Milton, GA (US); Joseph Guerrisi, Sandy Springs, GA (US); Daniel Kettleson, Hamel, MN (US); Michael Mulholland, Snohomish, WA (US)

(73) Assignee: United Parcel Service of America, Inc., Atlanta, GA (US)

( * ) Notice: Subject to any disclaimer, the term of this patent is extended or adjusted under 35 U.S.C. 154(b) by 199 days.

(21) Appl. No.: 13/828,652

(22) Filed: Mar. 14, 2013

Related U.S. Application Data

(60) Provisional application No. 61/761,915, filed on Feb. 7, 2013.

(51) Int. Cl.
*G06Q 30/06* (2012.01)
*G06Q 30/02* (2012.01)

(52) U.S. Cl.
CPC ................. *G06Q 30/0207* (2013.01)

(58) Field of Classification Search
USPC ........ 705/337, 338, 1, 60, 26.1, 6, 1.1, 7.11, 705/330, 331, 332; 709/228, 229;
(Continued)

(56) References Cited

U.S. PATENT DOCUMENTS 4,611,268 A   9/1986 Gotz et al.
5,430,831 A   7/1995 Snellen
(Continued)

FOREIGN PATENT DOCUMENTS

CN   1598850 A   3/2005
GB   2461722 A   1/2010
(Continued)

OTHER PUBLICATIONS

International Searching Authority, International Search Report and Written Opinion for International Application No. PCT/US2012/044556, dated Jan. 15, 2013, United States Patent and Trademark Office, 19 pages, USA.

(Continued)

*Primary Examiner* — Akiba K Allen
(74) *Attorney, Agent, or Firm* — Shook, Hardy & Bacon L.L.P.

(57) ABSTRACT

Various embodiments provide systems and methods for encouraging online merchants to tender shipments according to specified criteria such that its delivery can be synchronized with anticipated and/or forecasted deliveries to the same or nearby addresses. In this way, a more efficient delivery of the shipment may be achieved. The encouragement or incentive may be in the form of a decrease in shipping cost for the particular shipment, a general shipping discount for selecting a threshold number of incentivized shipments, or some other incentive schedule. In some embodiments, the incentives may not be financially based and instead may be reductions in emissions, fuel consumption, improved customer experience (e.g., multiple deliveries at the same time versus separate deliveries) and the like. Of course, any combination of incentives may be provided both financial and otherwise.

30 Claims, 5 Drawing Sheets

(58) Field of Classification Search
USPC .................................. 379/230, 221.08, 88.18
See application file for complete search history.

(56) References Cited

U.S. PATENT DOCUMENTS

| | | | |
|---|---|---|---|
| 5,699,258 | A | 12/1997 | Thiel |
| 6,219,653 | B1 | 4/2001 | O'Neill et al. |
| 6,477,503 | B1 | 11/2002 | Mankes |
| 6,606,604 | B1 | 8/2003 | Dutta |
| 6,622,127 | B1 | 9/2003 | Klots et al. |
| 6,701,299 | B2 | 3/2004 | Kraisser et al. |
| 6,952,628 | B2 | 10/2005 | Prutu |
| 7,015,824 | B2 | 3/2006 | Cleveland et al. |
| 7,137,556 | B1 | 11/2006 | Bonner et al. |
| 7,139,721 | B2 | 11/2006 | Borders et al. |
| 7,158,948 | B1 | 1/2007 | Rodriguez et al. |
| 7,177,825 | B1 | 2/2007 | Borders et al. |
| 7,181,426 | B2 | 2/2007 | Dutta |
| 7,233,907 | B2 | 6/2007 | Young |
| 7,252,227 | B2 | 8/2007 | Chase |
| 7,313,460 | B1 | 12/2007 | Prater et al. |
| 7,363,126 | B1 | 4/2008 | Zhong et al. |
| 7,509,228 | B2 | 3/2009 | Bielefeld et al. |
| 7,624,024 | B2 | 11/2009 | Levis et al. |
| 7,647,233 | B2 * | 1/2010 | Kadaba ................. G06Q 10/025 705/1.1 |
| 7,831,439 | B1 | 11/2010 | Bryar et al. |
| 7,925,524 | B2 | 4/2011 | Florence |
| 7,962,422 | B1 | 6/2011 | Melechko et al. |
| 8,068,930 | B2 | 11/2011 | Perez et al. |
| 8,108,321 | B2 | 1/2012 | Neal et al. |
| 8,306,875 | B2 | 11/2012 | Schneur |
| 8,311,850 | B2 | 11/2012 | Johnson et al. |
| 8,386,397 | B1 | 2/2013 | Agarwal et al. |
| 8,407,151 | B1 | 3/2013 | Agarwal et al. |
| 8,407,154 | B1 | 3/2013 | Fallows |
| 8,433,659 | B2 | 4/2013 | Johnston et al. |
| 8,554,694 | B1 | 10/2013 | Ward et al. |
| 8,572,002 | B2 * | 10/2013 | Kadaba .......................... 705/337 |
| 8,615,473 | B2 | 12/2013 | Spiegel et al. |
| RE45,160 | E * | 9/2014 | Ferlauto ............ G06F 17/30303 707/692 |
| 8,924,312 | B2 | 12/2014 | Kadaba |
| 9,020,846 | B2 | 4/2015 | Siris |
| 2001/0029473 | A1 | 10/2001 | Yamaoka et al. |
| 2001/0042024 | A1 | 11/2001 | Rogers |
| 2001/0051885 | A1 | 12/2001 | Nardulli et al. |
| 2002/0007299 | A1 | 1/2002 | Florence |
| 2002/0007353 | A1 | 1/2002 | Kornacki |
| 2002/0016726 | A1 | 2/2002 | Ross |
| 2002/0103724 | A1 * | 8/2002 | Huxter ................. G06Q 10/087 705/28 |
| 2002/0107820 | A1 | 8/2002 | Huxter |
| 2002/0111914 | A1 * | 8/2002 | Terada .................. G06Q 10/08 705/60 |
| 2002/0178023 | A1 | 11/2002 | Bjerre et al. |
| 2003/0009361 | A1 | 1/2003 | Hancock et al. |
| 2003/0036935 | A1 | 2/2003 | Nel |
| 2003/0130753 | A1 | 7/2003 | Grant et al. |
| 2003/0200111 | A1 | 10/2003 | Damji |
| 2004/0030572 | A1 | 2/2004 | Campbell et al. |
| 2004/0151068 | A1 | 8/2004 | Carlsruh et al. |
| 2004/0215480 | A1 * | 10/2004 | Kadaba ................. G06Q 10/083 705/338 |
| 2004/0249699 | A1 | 12/2004 | Laurent et al. |
| 2005/0080638 | A1 | 4/2005 | Maseruka |
| 2005/0165629 | A1 * | 7/2005 | Bruns ............................... 705/6 |
| 2005/0171738 | A1 | 8/2005 | Kadaba |
| 2005/0267791 | A1 | 12/2005 | LaVoie et al. |
| 2006/0041481 | A1 | 2/2006 | Stowe |
| 2006/0261164 | A1 | 11/2006 | Bochicchio |
| 2007/0083410 | A1 | 4/2007 | Hanna |
| 2008/0245873 | A1 | 10/2008 | Dwinell et al. |
| 2008/0301009 | A1 | 12/2008 | Plaster et al. |
| 2009/0106124 | A1 | 4/2009 | Yang |
| 2009/0164295 | A1 | 6/2009 | Sion |
| 2009/0187489 | A1 | 7/2009 | Mallick et al. |
| 2010/0004960 | A1 | 1/2010 | Frankenberg et al. |
| 2010/0094769 | A1 | 4/2010 | Davidson et al. |
| 2010/0100507 | A1 | 4/2010 | Davidson et al. |
| 2010/0121689 | A1 | 5/2010 | Wallace et al. |
| 2010/0161170 | A1 | 6/2010 | Siris |
| 2010/0169000 | A1 | 7/2010 | Overgoor et al. |
| 2010/0312715 | A1 | 12/2010 | Esque et al. |
| 2011/0258014 | A1 | 10/2011 | Evangelist et al. |
| 2011/0288958 | A1 | 11/2011 | Obasanjo et al. |
| 2012/0030133 | A1 | 2/2012 | Rademaker |
| 2012/0246090 | A1 | 9/2012 | Griffith et al. |
| 2012/0284083 | A1 * | 11/2012 | Wu ........................ G06Q 10/08 705/7.31 |
| 2012/0303540 | A1 | 11/2012 | Marcus et al. |
| 2013/0013350 | A1 | 1/2013 | McCullough et al. |
| 2013/0144428 | A1 | 6/2013 | Irwin et al. |
| 2013/0151435 | A1 * | 6/2013 | Hocquette ............ G06Q 10/083 705/338 |
| 2013/0166359 | A1 | 6/2013 | Kadaba |
| 2013/0262336 | A1 | 10/2013 | Wan et al. |
| 2013/0325741 | A1 | 12/2013 | Smalling et al. |
| 2014/0025464 | A1 | 1/2014 | Kadaba |
| 2014/0052661 | A1 | 2/2014 | Shakes et al. |
| 2014/0095350 | A1 | 4/2014 | Carr et al. |
| 2014/0148944 | A1 | 5/2014 | Bailey et al. |
| 2014/0149244 | A1 * | 5/2014 | Abhyanker .......... G06Q 10/087 705/26.2 |
| 2014/0188748 | A1 | 7/2014 | Cavoue et al. |
| 2014/0229338 | A1 | 8/2014 | Borders et al. |
| 2014/0297554 | A1 * | 10/2014 | Armato ................... H04W 4/22 705/338 |
| 2014/0330741 | A1 | 11/2014 | Bialynicka-Birula et al. |
| 2015/0081587 | A1 | 3/2015 | Gillen |
| 2015/0178678 | A1 | 6/2015 | Car et al. |
| 2015/0199644 | A1 | 7/2015 | Siris |
| 2015/0248795 | A1 | 9/2015 | Davidson |
| 2015/0269520 | A1 | 9/2015 | Knapp et al. |
| 2015/0294262 | A1 | 10/2015 | Nelson et al. |
| 2015/0302347 | A1 | 10/2015 | Fredette |
| 2015/0356503 | A1 * | 12/2015 | LaVoie ............. G06Q 10/06315 705/338 |
| 2015/0363843 | A1 | 12/2015 | Loppatto et al. |
| 2016/0071056 | A1 | 3/2016 | Ellison et al. |

FOREIGN PATENT DOCUMENTS

| | | |
|---|---|---|
| WO | WO 2000/068856 A2 | 11/2000 |
| WO | WO 2001/071534 A2 | 9/2001 |
| WO | WO 2013/134417 A1 | 9/2013 |

OTHER PUBLICATIONS

U.S. Appl. No. 14/664,202, "Determining Delivery Windows for Item Delivery Based on Customer and/or Item Location", Unpublished (filed Mar. 20, 2015), (Leslie Nelson, Inventor) (United Parcel Service of America, Inc., assignee).
European Patent Office, Extended European Search Report for Application No. 12735985.9, dated Aug. 27, 2015, 8 pages, Germany.
"How it Works—Cargo Sensors," General Electric Company, http://web.archive.org/web/20070307032108/http://www.trailerservices.com/veriwise/cargo.html, Mar. 7, 2007.
"Tap Your Phone, Get Stuff (Including Funding)" [online] [retrieved May 27, 2015]. Retrieved from the Internet: <URL: http://techcrunch.com/2014/04/06/tap-your-phone-get-stuff-including-funding/> (dated Apr. 6, 2014) 8 pages.
American Airlines, "American Airlines Cargo—Reservations", Aug. 5, 2013 to Sep. 19, 2015, Internet Archive <http://web.archive.org/web/20130805094248/https://www.aacargo.com/learn/reservations.html>, 4 pages.
Browning-Blas, Kristen, "Schwan's frozen-food truckers are driven to make customers' day", *The Denver Post*, Sep. 17, 2008, retrieved from<http://www.denverpost.com/browning/ci_10472479>, on Mar. 20, 2016, 9 pages, U.S.A.

(56) References Cited

OTHER PUBLICATIONS

Evans, Kenneth R., et al., "Purchasing Motor Carrier Service: An Investigation of the Criteria Used by Small Manufacturing Firms", *Journal of Small Business Management*, vol. 28.1, p. 39, 1990; retrieved from Google Scholar at <https://www.questia.com/library/journal/1G1-8854587/purchasing-motor-carrier-service-an-investigation>, on Mar. 20, 2016.

U.S. Appl. No. 13/964,766, "Methods, Apparatuses and Computer Program Products for Generating Logistics Zones", Unpublished (filed Aug. 12, 2013), (Mark J. Davidson, Inventor) (United Parcel Service of America, Inc., assignee).

U.S. Appl. No. 14/046,172, "Methods, Apparatuses and Computer Program Products for Identifying Duplicate Travel", Unpublished (filed Oct. 4, 2013), (Mark J. Davidson, inventor) (United Parcel Service of America, Inc., assignee).

U.S. Appl. No. 14/859,766, "Systems and Methods for Reserving Space in Carrier Vehicles to Provide on Demand Delivery Services", Unpublished (filed Sep. 21, 2015), (Paul Loubriel, Inventor) (United Parcel Service of America, Inc., assignee).

U.S. Appl. No. 14/988,136, "Systems and Methods for Synchronized Delivery", Unpublished (filed Jan. 5, 2016), (Chris Bolton, Inventor) (United Parcel Service of America, Inc., assignee).

U.S. Appl. No. 14/988,527, "Systems and Methods for Synchronized Delivery", Unpublished (filed Jan. 5, 2016), (Chris Bolton, Inventor) (United Parcel Service of America, Inc., assignee).

U.S. Appl. No. 14/988,536, "Systems and Methods for Synchronized Delivery", Unpublished (filed Jan. 5, 2016), (Chris Bolton, Inventor) (United Parcel Service of America, Inc., assignee).

U.S. Appl. No. 14/988,545, "Systems and Methods for Synchronized Delivery", Unpublished (filed Jan. 5, 2016), (Chris Bolton, Inventor) (United Parcel Service of America, Inc., assignee).

U.S. Appl. No. 14/988,552, "Systems and Methods for Synchronized Delivery", Unpublished (filed Jan. 5, 2016), (Chris Bolton, Inventor) (United Parcel Service of America, Inc., assignee).

U.S. Appl. No. 14/988,561, "Systems and Methods for Synchronized Delivery", Unpublished (filed Jan. 5, 2016), (Chris Bolton, Inventor) (United Parcel Service of America, Inc., assignee).

Wohlsen, Marcus, "How Robots and Military-Grade Algorithms Make Same-Day Delivery Possible", Wired.com, Mar. 19, 2013, 8 pages, retrieved from <http://www.wired.com/category/business/?p=76398>, on Mar. 20, 2016.

United States Patent and Trademark Office, Office Action for U.S. Appl. No. 14/988,527, dated May 11, 2016, 26 pages, U.S.A.

United States Patent and Trademark Office, Office Action for U.S. Appl. No. 14/988,561, dated Jul. 28, 2016, 23 pages, U.S.A.

United States Patent and Trademark Office, Office Action for U.S. Appl. No. 14/988,527, dated Nov. 17, 2016, 40 pages, U.S.A.

United States Patent and Trademark Office, Office Action for U.S. Appl. No. 14/988,561, dated Dec. 12, 2016, 33 pages, U.S.A.

Non-Final Rejection dated Jun. 27, 2017 for U.S. Appl. No. 14/988,561.

Non-Final Rejection dated Jul. 28, 2017 for U.S. Appl. No. 14/988,527.

Final Rejection dated Dec. 19, 2017 for U.S. Appl. No. 14/988,561.

Applicant Initiated Interview Summary (PTOL-413) dated Jan. 24, 2018 for U.S. Appl. No. 14/988,561.

Non-Final Office Action received for U.S. Appl. No. 14/988,136, dated Aug. 28, 2018, 19 pages.

Non-Final Office Action received for U.S. Appl. No. 14/988,552, dated Oct. 4, 2018, 17 pages.

\* cited by examiner

| Address | Indicator |
|---|---|
| 1 Aardvark Avenue | N |
| ... | |
| 2799 Zwanandale Lane | Y |

Fig. 3

| Address | Day 1 Indicator | Day 2 Indicator | Day 3 Indicator |
|---|---|---|---|
| 1 Aardvark Avenue | N | Y | N |
| ... | | | |
| 2799 Zwanandale Lane | Y | N | Y |

Fig. 4

SYSTEMS AND METHODS FOR SYNCHRONIZED DELIVERY

CROSS-REFERENCE TO RELATED APPLICATIONS

This application claims priority to U.S. Patent Application No. 61/761,915 filed Feb. 7, 2013, the contents of which are incorporated herein by reference in its entirety.

BACKGROUND OF THE INVENTION

A common challenge faced by delivery companies (aka "carriers") is to increase the density of deliveries to addresses, areas or regions. Increased density not only improves efficiency of the deliveries, it also reduces fuel consumed and emissions per shipment. However, carriers are limited in their ability to affect the density of deliveries. Typically, carriers are forced into a reactive mode in trying to aggregate packages already received from shippers. For example, U.S. Publication No. 2006/0041481 to Stowe and assigned to United Parcel Service of America, Inc. describes various methods for aggregating packages within a carrier network. Needs therefore exist for systems and methods that allow carriers to proactively manage the receipt of shipments to facilitate more efficient delivery.

BRIEF SUMMARY OF THE INVENTION

In general, embodiments of the present invention provide systems, methods, apparatus, and computer program products for identifying possible (or probable) synchronized delivery opportunities and delivery incentives.

In accordance with one aspect, a method for encouraging synchronized delivery of a prospective shipment is provided. The method includes the steps of: creating a plurality of address profiles using historical data, wherein each address profile identifies at least one of (a) a frequency of stops associated with an address or nearby addresses, (b) costs associated with making a stop associated with an address or nearby of addresses and (c) a reputation associated with an address or nearby addresses; receiving shipping information from a merchant, via a computer system, for a prospective shipment, wherein the shipping information includes a destination address; identifying a certain address profile associated with the destination address; applying business rules to the certain address profile to determine whether the prospective shipment qualifies for an incentive; and sending an indicator message to the merchant indicating whether the prospective shipment qualifies for an incentive based on the application of the business rules.

In another aspect, a method for encouraging synchronized delivery of a prospective shipment is provided. The method includes the steps of: receiving shipping information from a merchant, via a computer system, for a prospective shipment, wherein the shipping information includes a destination address; comparing the destination address to dynamic data relating to deliveries forecasted for delivery to the destination address or nearby address; identifying dates in which one or more stop creator shipments are forecasted for delivery to the destination address or nearby addresses; applying business rules to the one or more stop creator shipments to determine if the prospective shipment qualifies for an incentive; and sending an indicator message to the merchant indicating whether the prospective shipment qualifies for an incentive based on the application of the business rules.

In a further aspect, an apparatus including at least one processor and at least one memory including computer program code is provided. The at least one memory and the computer program code are configured to, with the processor, cause the apparatus to at least: create a plurality of address profiles using historical data, wherein each address profile identifies at least one of (a) a frequency of stops associated with an address or nearby addresses, (b) costs associated with making a stop associated with the address or nearby addresses and (c) a reputation associated with an address or nearby addresses; receive shipping information from a merchant, via a computer system, for a prospective shipment, wherein the shipping information includes a destination address; identify a certain address profile associated with the destination address; apply business rules to the certain address profile to determine whether the prospective shipment qualifies for an incentive; and send an indicator message to the merchant indicating whether the prospective shipment qualifies for an incentive based on the application of the business rules.

In another aspect, an apparatus comprising at least one processor and at least one memory including computer program code is provided. The at least one memory and the computer program code are configured to, with the processor, cause the apparatus to at least: receive shipping information from a merchant, via a computer system, for a prospective shipment, wherein the shipping information includes a destination address; compare the destination address to dynamic data relating to deliveries forecasted for delivery to the destination address or nearby address; identify dates in which one or more stop creator shipments are forecasted for delivery to the destination address or nearby addresses; apply business rules to the one or more stop creator shipments to determine if the prospective shipment qualifies for an incentive; and send an indicator message to the merchant indicating whether the prospective shipment qualifies for an incentive based on the application of the business rules.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3 is a table illustrating the types of data that may be stored in a historic incentive database in accordance with certain embodiments of the present invention;

FIG. 4 is a table illustrating the types of data that may be stored in a dynamic incentive database in accordance with certain embodiments of the present invention;

DETAILED DESCRIPTION OF THE INVENTION

Figure 1:
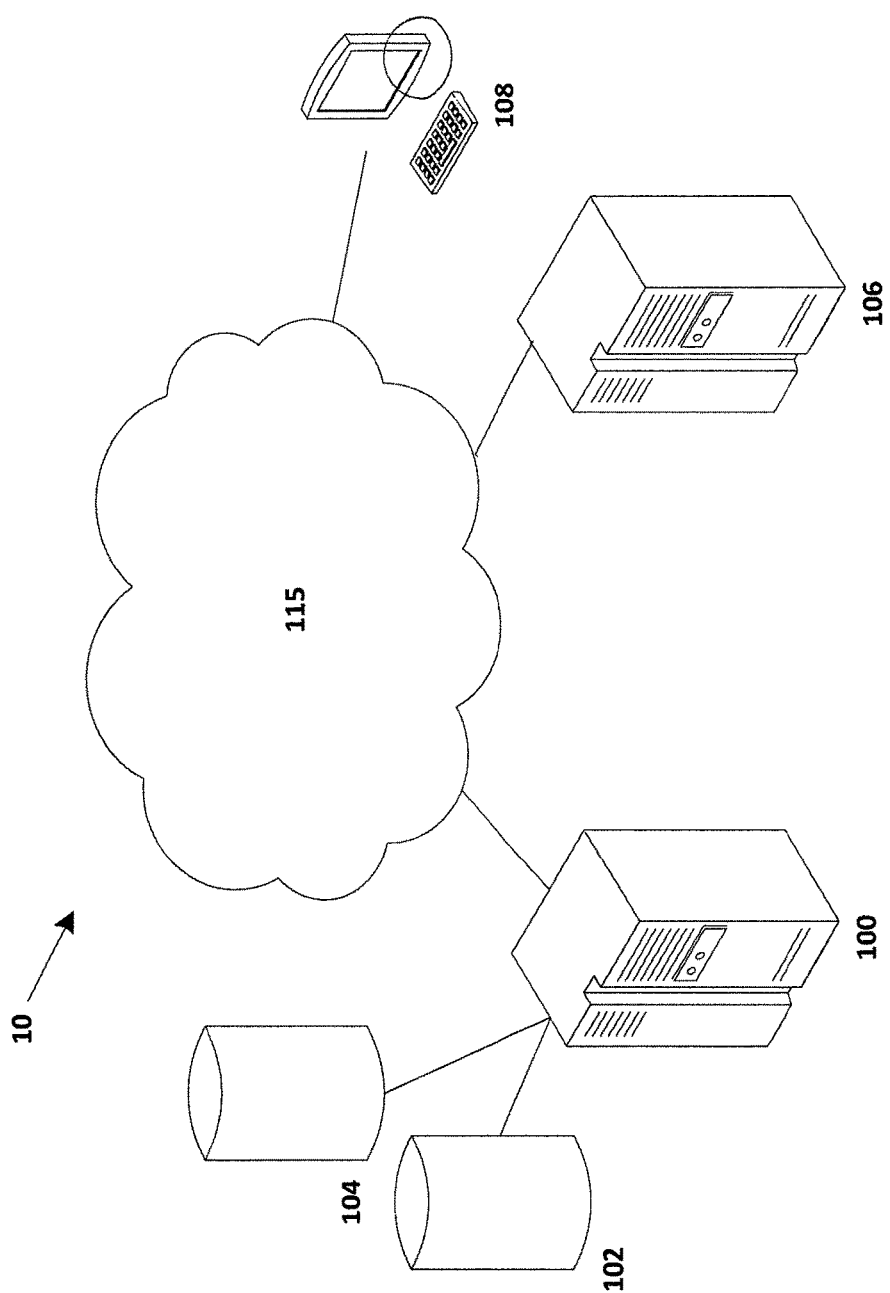
FIG. 1 is a schematic diagram of a system that may be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Generally, embodiments of the present invention provide systems and methods that propose indicators to shippers to facilitate efficient delivery of items. The indicator could be a price incentive, yes/no acceptance of a shipment, alternative service levels, delivery dates, hold for additional shipping density options and the like. The shippers may be merchants (online or brick-and-mortar), component suppliers, individuals or any other entity seeking to ship an item. To facilitate understanding, aspects of various embodiments of the present invention will be described in the context of an online merchant. However, it should be understood that concepts described herein could be used to facilitate synchronized delivery for any type of shipping entity or transport mode.

In various embodiments, an online merchant may receive an order and/or a cost inquiry from a customer for the purchase and delivery of one or more items. As a result, the online merchant may need to determine a shipping cost for delivery of the item to the customer. In various embodiments, the online merchant may also use the shipping cost information received from multiple carriers to determine which carrier to use for the delivery. To determine the shipping costs, the online merchant may send the destination address and a promised delivery date or range of dates to a carrier and request an associated cost for the delivery. In some embodiments, different combinations of data may be sent such as service levels, weight of the shipment, size of the shipment, and the like. As will be recognized, a shipment may be a parcel or group of parcels, a package or group of packages, a box, a crate, a drum, a box strapped to a pallet, and/or the like. The carrier may be a common carrier, a contract carrier or a private carrier.

In other embodiments, the online merchant may communicate with a third party as opposed to a carrier. The third party may then perform the various analyses describe herein with respect to the carrier.

In various embodiments, the carrier may analyze historical data related to some or all of the addresses serviced by the carrier to determine whether an incentive may be provided to encourage further deliveries to particular addresses. Characteristics of the address' delivery history considered in determining whether to provide an incentive may include the number of deliveries received by (or picked up from) the particular address or nearby addresses, the typical days of the delivery, the type of location (e.g., residential or commercial), scheduled pickups, whether signatures are typically required for delivery versus driver release, the number of claims, and/or the frequency of missed delivery events at the particular address. The incentives may be based at least in part on the probability that the new shipment can be synchronized with other deliveries to the same address or a nearby address. Other considerations may include characteristics of the shipper and/or characteristics of the shipment itself (e.g., size, weight, number of packages, special handling requirements, etc.).

In some embodiments, the carrier may analyze dynamic data relating to shipments that are forecasted (e.g., shipments with a forecasted delivery date, a scheduled shipment, a planned delivery) to be delivered to the address or nearby addresses. This data is sometimes referred to as package level detail ("PLD") data, which may be updated as the shipment is received and transported through a carrier's network to a destination address. In various embodiments, the dynamic data includes data for forecasted shipments and may include a ship date, an origin address, destination address, service level, a forecasted delivery date, a unique identifier and exception information. Using this information, a carrier may determine whether the new shipment delivery (e.g., tagalong shipment) could be synchronized with one or more shipments already forecasted for delivery to the address or nearby addresses (e.g., stop creator shipment, which is the reason for the initial stop). If this is the case, the carrier may offer an incentive to the online merchant to provide the shipment according to certain criteria such that the deliveries of the tagalong shipment and the stop creator shipment(s) can be synchronized. This synchronization may reduce fuel consumed and carbon emissions versus a non-synchronized delivery. Furthermore, the customer's experience may also be enhanced because the customer can receive a single delivery with multiple shipments versus multiple shipments on possibly different days, at different times and/or by different carriers.

As noted, the carrier may communicate to the online merchant that a delivery incentive is available for the particular address. In various embodiments, the carrier may communicate an incentive for delivery according to a particular delivery date. Under this scenario, the online merchant could independently identify a fulfillment center and use time-in-transit data to calculate an actual tender date to the carrier. In various embodiments, the online merchant may receive the incentive if the deliveries were synchronized and/or the online merchant tenders the shipment with sufficient time to synchronize the shipments. In other embodiments, the carrier may provide a tender date (or range of dates) for one or more origin addresses (e.g., fulfillment centers or drop-ship locations). The proposed origin addresses could be based on proximity of one or more particular fulfillment centers to the destination address, routing parameters, time-in-transit, consignee alternative delivery locations, environmental considerations, sensor based data such as telematics data and the like. Under this scenario, the online merchant may receive the incentive if the shipment was tendered on a date identified by the carrier for the appropriate fulfillment center.

I. Methods, Apparatus, Systems, and Computer Program Products

Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable storage media (including volatile and non-volatile media).

In one embodiment, a non-volatile computer-readable storage medium may include a floppy disk, flexible disk, hard disk, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory, multimedia memory cards (MMC), secure digital (SD) memory cards, Memory Sticks, and/or the like. Further, a non-volatile computer-readable storage medium may also include conductive-bridging random access memory (CBRAM), phase-change random access memory (PRAM), ferroelectric random-access memory (FeRAM), resistive random-access memory (RRAM), Silicon-Oxide-Nitride-Oxide-Silicon memory (SONOS), racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended information/data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Rambus in-line memory module (RIMM), dual in-line memory module (DIMM), single in-line memory module (SIMM), video random access memory VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations, respectively, may be implemented in the form of a computer program product, an entirely hardware embodiment, a combination of hardware and computer program products, and/or apparatus, systems, computing devices, computing entities, and/or the like carrying out instructions on a computer-readable storage medium for execution. Such embodiments can produce specifically-configured machines performing the steps or operations specified in the block diagrams and flowchart illustrations. Accordingly, the block diagrams and flowchart illustrations support various combinations of embodiments for performing the specified steps or operations.

II. Exemplary System Architecture

FIG. 1 provides an illustration of a system architecture that can be used in conjunction with various embodiments of the present invention. The system 10 of FIG. 1 may comprise one or more carrier servers 100, one or more historical data repositories 102, one or more PLD data repositories 104, one or more online merchant servers 106, one or more networks 115, and/or one or more customer computing devices 108. Each of the components of the system 10 may be in electronic communication with (directly or indirectly), for example, one another over the same or different wireless or wired networks including, for example, a wired or wireless Personal Area Network (PAN), Local Area Network (LAN), Metropolitan Area Network (MAN), Wide Area Network (WAN), cellular network, or the like.

It should be noted that other system architectures are contemplated that may be used to practice various aspects of the invention. Thus, the system architecture provided in FIG. 1 is for illustrative purposes only and should not be construed to limit the scope of the invention. Further, while FIG. 1 illustrates certain system entities as separate, standalone entities, the various embodiments are not limited to this particular architecture.

a. Exemplary Carrier Server

Figure 2:
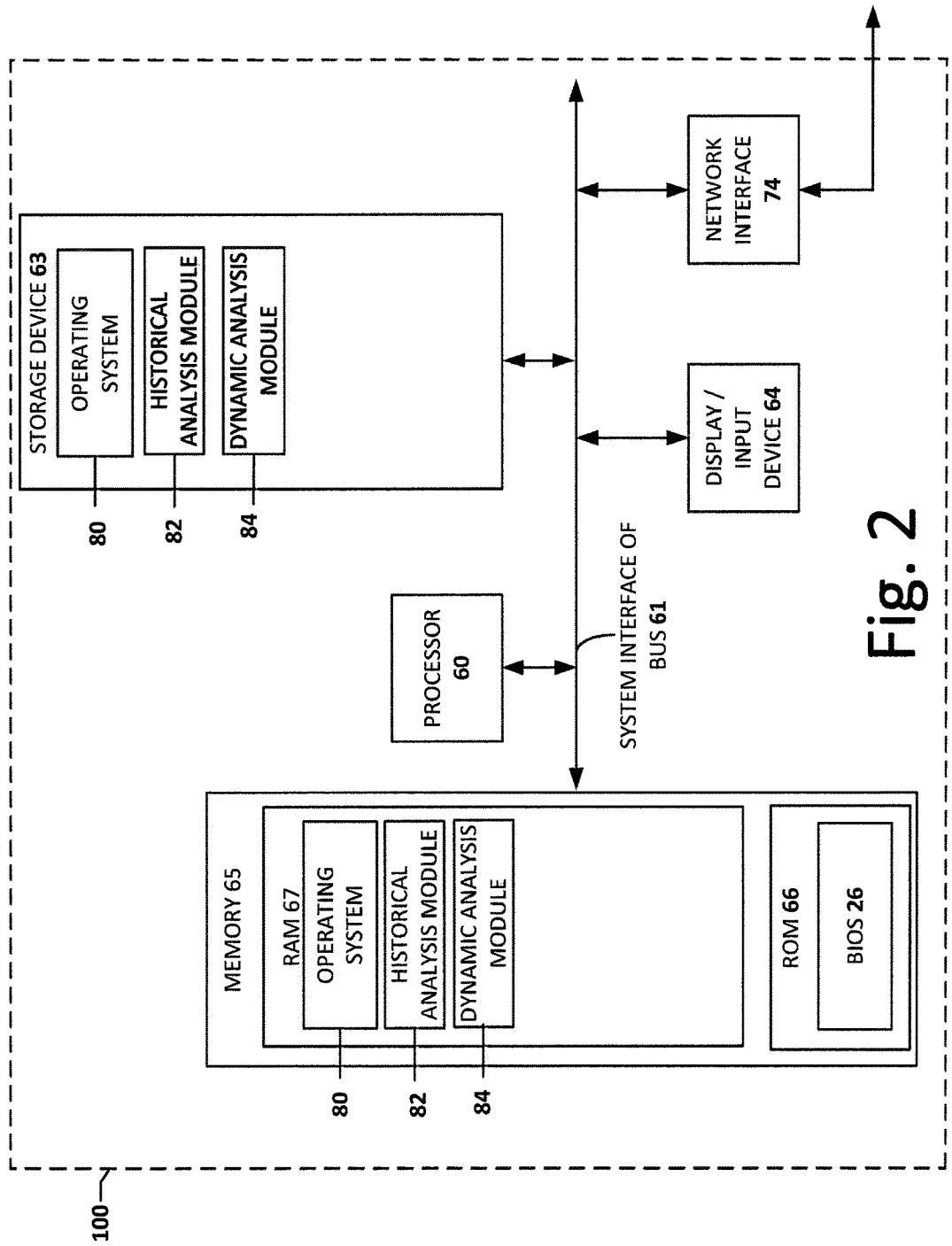
FIG. 2 is a schematic diagram of a carrier server in accordance with certain embodiments of the present invention.

FIG. 2 provides a schematic of a carrier server 100 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the carrier server 100 may include a processor 60 that communicates with other elements within the carrier server 100 via a system interface or bus 61. The processor 60 may be embodied in a number of different ways. For example, the processor 60 may be embodied as one or more processing elements, one or more microprocessors with accompanying digital signal processors, one or more processors without accompanying digital signal processors, one or more coprocessors, one or more multi-core processors, one or more controllers, and/or various other processing devices including integrated circuits such as, for example, an application specific integrated circuit (ASIC), a field programmable gate array (FPGA), a hardware accelerator, and/or the like.

In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention when configured accordingly. A display device/input device 64 for receiving and displaying data may also be included in or associated with the carrier server 100. The display device/input device 64 may be, for example, a keyboard or pointing device that is used in combination with a monitor. The carrier server 100 may further include transitory and non-transitory memory 65, which may include both random access memory (RAM) 67 and read only memory (ROM) 66. The carrier server's ROM 66 may be used to store a basic input/output system (BIOS) 26 containing the basic routines that help to transfer information to the different elements within the carrier server 100.

In addition, in one embodiment, the carrier server 100 may include at least one storage device 63, such as a hard disk drive, a CD drive, a DVD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EEPROM), flash memory, hard disk, and/or the like. Additionally, each of these storage devices 63 may be connected to the system bus 61 by an appropriate interface.

Furthermore, a number of executable instructions, applications, scripts, program modules, and/or the like may be stored by the various storage devices 63 and/or within RAM 67. Such executable instructions, applications, scripts, program modules, and/or the like may include an operating system 80, a historical analysis module 82 and a dynamic analysis module 84. As discussed in greater detail below, the historical analysis module 82 and the dynamic analysis module 84 may control certain aspects of the operation of the carrier server 100 with the assistance of the processor 60 and operating system 80, although its functionality need not be modularized. In addition to the program modules, the carrier server 100 may store and/or be in communication with one or more databases.

Also located within and/or associated with the carrier server 100, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), and/or any other wired transmission protocol. Similarly, the carrier server 100 may be configured to communicate via wireless external communication networks using any of a variety of protocols, such as 802.11, GSM, EDGE, GPRS, UMTS, CDMA2000, WCDMA, TD-SCDMA, LTE, E-UTRAN, Wi-Fi, WiMAX, UWB, NAMPS, TACS and/or any other wireless protocol.

It will be appreciated that one or more of the carrier server's 100 components may be located remotely from other carrier server 100 components. Furthermore, one or more of the components may be combined and additional components performing functions described herein may be included in the carrier server 100. It should be noted that the one or more of the carrier servers 100 may be operated by a carrier, a third party or certain tasks may be performed by carrier servers operated by the carrier while other tasks are performed by carrier servers operated by a third party.

b. Exemplary Customer Computing Device

The customer computing devices 108 may each include one or more components that are functionally similar to those of the carrier server 100. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "computing device" is used generically to refer to any computer, computing device, desktop, notebook computer, laptop computer, distributed system, carrier system, gateway, switch, or other processing device adapted to perform the functions described herein.

c. Exemplary Online Merchant Server

Various embodiments may include an online merchant server that provides an order processing system (e.g., retail website, online catalog, online store front, etc.) The components of the online merchant server may include one or more components that are functionally similar to those of the carrier server 100. For example, in one embodiment, each of the customer computing devices may include: (1) a processor that communicates with other elements via a system interface or bus; (2) a display device/input device; (3) transitory and non-transitory memory; and (4) a communications interface. These architectures are provided for exemplary purposes only and are not limiting to the various embodiments. The term "server" is used generically to refer to any computer, computing device, desktop, notebook or laptop, distributed system, carrier system, gateway, switch, or other processing device adapted to perform the functions described herein.

III. Exemplary System Operation

Various embodiments provide systems and methods for encouraging online merchants to tender shipments according to specified criteria such that its delivery can be synchronized with anticipated and/or forecasted deliveries to the same or nearby addresses. In this way, a more efficient delivery of the shipment may be achieved. The encouragement or incentive may be in the form of a decrease in shipping cost for the particular shipment, a general shipping discount for selecting a threshold number of incentivized shipments, or some other incentive schedule. In some embodiments, the incentives may not be financially based and instead may be reductions in emissions, fuel consumption, improved customer experience (e.g., multiple deliveries at the same time versus separate deliveries) and the like. Of course, any combination of incentives may be provided both financial and otherwise.

As noted, the improved efficiency may be facilitated by synchronizing the delivery of new shipments (e.g., tagalong shipments) with shipments already en route to or near the destination address of the new shipment (e.g., stop creator shipments). In some embodiments, incentives are provided to encourage delivery to or near addresses for which shipments may not have been received but that historically receive shipments at a threshold frequency. Thus, the carrier may anticipate receiving shipments for the new shipment's destination address or addresses nearby and in turn provide incentives base on the probability of synchronized shipments. A nearby address may be an address within a certain distance threshold and/or have some other similarities with the provided address such as being on the same street, same neighborhood, same building, along the dispatched route, or the like. Other characteristics of the shipment may also be used to incentivize a delivery, deny an incentive or alter an incentive for a particular shipment such as routing parameters (e.g., lane densities, telematics data), consignee or shipper reputation, parking availability, cost of the delivery, safety concerns, carbon footprint, security, and the like. Thresholds may be assigned for the various characteristics to determine whether an incentive is available. Additionally, characteristics may be combined in any fashion to arrive at an incentive.

In various embodiments, the one or more carrier servers 100 analyzes information regarding some or all of the addresses serviced by the carrier to determine if an incentive should be provide for the particular address and under what conditions. In some embodiments, the analysis focuses on historical data associated with the address to ascertain characteristics of past deliveries to that address and/or nearby addresses to determine whether delivery to that address should be encouraged by an incentive. In other embodiments, dynamic data regarding shipments forecasted for delivery (e.g., shipments with a forecasted delivery date, scheduled shipment) to addresses served by the carrier may be analyzed to determine if further deliveries to particular addresses should be incentivized. The incentive determinations, whether based on historical data, dynamic data or a combination of historical and dynamic data, may relate to the ability to synchronize the delivery of a new shipment (e.g., tagalong shipment) with a shipment(s) anticipated or already forecasted for delivery to a particular address or nearby address (e.g., stop creator shipment(s)).

a. Incentives Based on Historical Data

As noted, the one or more carrier servers 100 may analyze historical data related to some or all of the addresses serviced by a carrier. In some embodiments, the one or more carrier servers 100 may populate (e.g., via the Historical Analysis Module 82) a historical incentive database to indicate whether an incentive may be offered for various addresses. FIG. 3 illustrates a possible structure for the historical incentive database or table. As illustrated, the historical database may include address information and an indication as to whether an incentive is available.

To create the historical incentive database, the one or more carrier servers 100 (e.g., via the Historical Analysis Module 82) may apply business rules to historical data associated with some or all of the addresses serviced by the carrier. In various embodiments, delivery address profiles may be established. The delivery address profile data may link a particular address to other nearby addresses (e.g., a close residential address, same neighborhood, commercial addresses within the same building, an apartment complex, duplex, along the same route, etc.). This linking may relate to a service point, which identifies where a service provider may stop to service one or more addresses. For example, a service provider may make a single stop (i.e. at a service point) to make deliveries to multiple address (or a single address) such as an apartment complex or shopping mall. The delivery address profile may include a list of consignees receiving items at the address, frequency of deliveries to or pickups from the address and/or nearby addresses (e.g., average daily volume, average weekly stops), typical days of delivery and/or pickup (e.g., Monday, Tuesday, Wednesday, etc.), costs associated with making a delivery to the address and/or nearby addresses, whether deliveries require consignee signatures or allow driver release, delivery type (e.g., residential or commercial), and stop reputation for the associated addresses or nearby addresses. The stop reputation may include data regarding missed deliveries, claims, delinquencies, etc. Additional information may include business names, suite, floor, building, apartment number, and the like.

The delivery address profile may be based on data collected over a particular time frame such as, for example, 3 months, 6 months, 1 year or the like. In some embodiments, the delivery address profile may be adjusted based on the time of year (e.g., seasonal, holidays, etc.).

In addition to the delivery address profile, a pickup location profile may also be created. The pickup location profile may include characteristics of the fulfillment or drop ship location as well as the shipper. The pickup location profile data may link a particular address to other nearby addresses (e.g., a close residential address, commercial addresses within the same building, an apartment complex, duplex, along the same route, etc.). The pickup location profile may include a list of shippers sending shipments from the address, frequency of deliveries to or pickups from the address and/or nearby addresses (e.g., average daily volume, average weekly stops), typical days of delivery and/or pickup (e.g., Monday, Tuesday, Wednesday, etc.), costs associated with making a pickup from the address and/or nearby addresses, delivery type (e.g., residential or commercial), and stop reputation for the associated addresses and/or nearby addresses. The stop reputation may include data regarding missed pickups, claims, delinquencies, etc. Additional information may include business names, suite, floor, building, apartment number, and the like.

Using various business rules, the one or more carrier servers 100 (e.g., via the Historical Analysis Module 82) may indicate in the historical incentive database whether a particular address should receive an incentive. For example, the business rules may establish a threshold average daily volume or average weekly deliveries to or pickups from the address or cumulative stops to nearby addresses to qualify for incentives. Furthermore, the incentives may be graduated based on the different thresholds. For example, business rules may set one incentive for a given volume threshold and a different incentive for a greater volume threshold. Similarly, different incentives may be given for a threshold volume associated with a particular address versus the same cumulative volume associated with nearby addresses. Business rules may also deny incentives for certain addresses due to reputation data and/or provide manual override capabilities. The overrides may be positive or negative and in some embodiments take precedent over other business rules. Business rules may also be set to provide incentives to all (or none) of the addresses in a particular area (e.g., high crime area, limited to domestic only, limited to certain cities, regions, proximity to fulfillment centers, neighborhoods, etc.). Some business rules may allow customers to "opt out" of the incentive service. In various embodiments, the business rules may use a combination of criteria to establish whether an incentive is to be offered. It should be noted that in some embodiments, the one or more carrier servers 100 may perform the historical incentive analysis "on the fly" as opposed to populating a separate historical incentive database. It should be noted that business rules may be adjusted based on characteristics of the shipper or the consignee—high claims, high volume, low volume, etc. Furthermore, the business rules may have a hierarchy. Some business rules may take precedent over other business rules. For example, an incentive may be denied even if an address match is found because of a high claims rate for the address. In another example, an incentive may be provided even if an address match is not found if there is a desire to increase delivery volume in a particular area. In some embodiments characteristics of the shipment may also impact the incentive such as the size, weight, number of packages, and the like.

b. Incentives Based on Dynamic Data

As noted, the one or more carrier servers 100 (e.g., via the Dynamic Analysis Module 84) may analyze dynamic data related to shipments forecasted for delivery to some or all of the addresses serviced by a carrier. In some embodiments, the one or more carrier servers 100 may populate a dynamic incentive database to indicate whether an incentive may be offered for various addresses and conditions that may be necessary to receive the incentive. This database may be updated continuously as new shipments are received and/or updated periodically (e.g., every 5 mins., 10 mins., hour, day, etc.)

To populate the dynamic incentive database, the one or more carrier servers 100 may access Package Level Detail ("PLD") data maintained by the carrier. As will be understood by those skilled in the art, carriers may maintain PLD data for each of the shipments that are forecasted to be delivered by the delivery network. This dynamic data may include data for each forecasted shipment such as a ship date, an origin address, destination address, service level, a forecasted delivery date, a unique identifier, and exception information. Using this information, the one or more carrier servers 100 can determine which days shipments are already forecasted for delivery to the various addresses serviced by the carrier.

The one or more carrier servers 100 (e.g., via the Dynamic Analysis Module 84) may apply business rules to the PLD data to determine whether an incentive may be offered for the address and what conditions would be necessary to receive the incentive. For example, the PLD data may indicate that existing deliveries are forecasted for the address or a nearby address on one or more particular dates. Thus, if the online merchant tenders the shipment to the carrier with sufficient time to be delivered on one of those particular dates in which synchronization can occur, an incentive may be provided. FIG. 4 illustrates a possible structure for a PLD incentive database. In the illustrated embodiment, an address is provided and an indication as to whether an incentive is available for Day 1, Day 2, Day 3, etc. For example, delivery to "1 Aardvark Avenue" may be incentivized on Day 2 but not on Days 1 and 3. It should be noted that additional days and/or time frames may be provided in the dynamic incentive database as desired.

In various embodiments, each "Day" indication may be a tendered date from the online merchant to the carrier, or a delivery date to the consignee. In various embodiments, separate data sets may be created for address matches versus nearby address matches. These separate data sets may be associated with different incentive amounts. It should be noted that in some embodiments, the one or more carrier servers 100 may perform the dynamic incentive analysis "on the fly" as opposed to populating a separate dynamic incentive database.

Business rules may also provide positive or negative overrides for incentive determinations based on dynamic data or historic or any other type of data. For example, the overrides may indicate that certain addresses should or should not receive incentives. In various embodiments, the override decisions may be based on some criteria such as location (e.g., postal codes, delivery segments, telematics data, latitude/longitude coordinates, suites, floors, buildings, apartments, etc.), delivery cost, consignee names, delivery days, service levels, volume on delivery lanes, time-in-transit and the like. The override business rules may be updated periodically.

c. Incentives Base on Historic and Dynamic Data

In various embodiments, the historical incentive data and the dynamic incentive data may be combined into a single incentive database. For example, the incentive database may have fields for each address indicating whether, based on historical data, an incentive is appropriate as generally described above with reference to the historical incentive database. In addition, the incentive database may also be updated based on separate dynamic data to determine if particular delivery days are appropriate for an incentive. In various embodiments, business rules may be applied to identify different incentives for different combinations of historical and dynamic data characteristics. For example, a business rule may identify incentive "A" when the historical data shows an incentive but the dynamic data shows no incentive. Alternatively, a business rule may identify incentive "B" when the historical data shows an incentive and certain days of the dynamic data are incentivized as well. Of course any combination of incentives may be provided including applying the same incentive for any positive indication.

c. Method for Determining an Incentive for a Shipment

Figure 5:
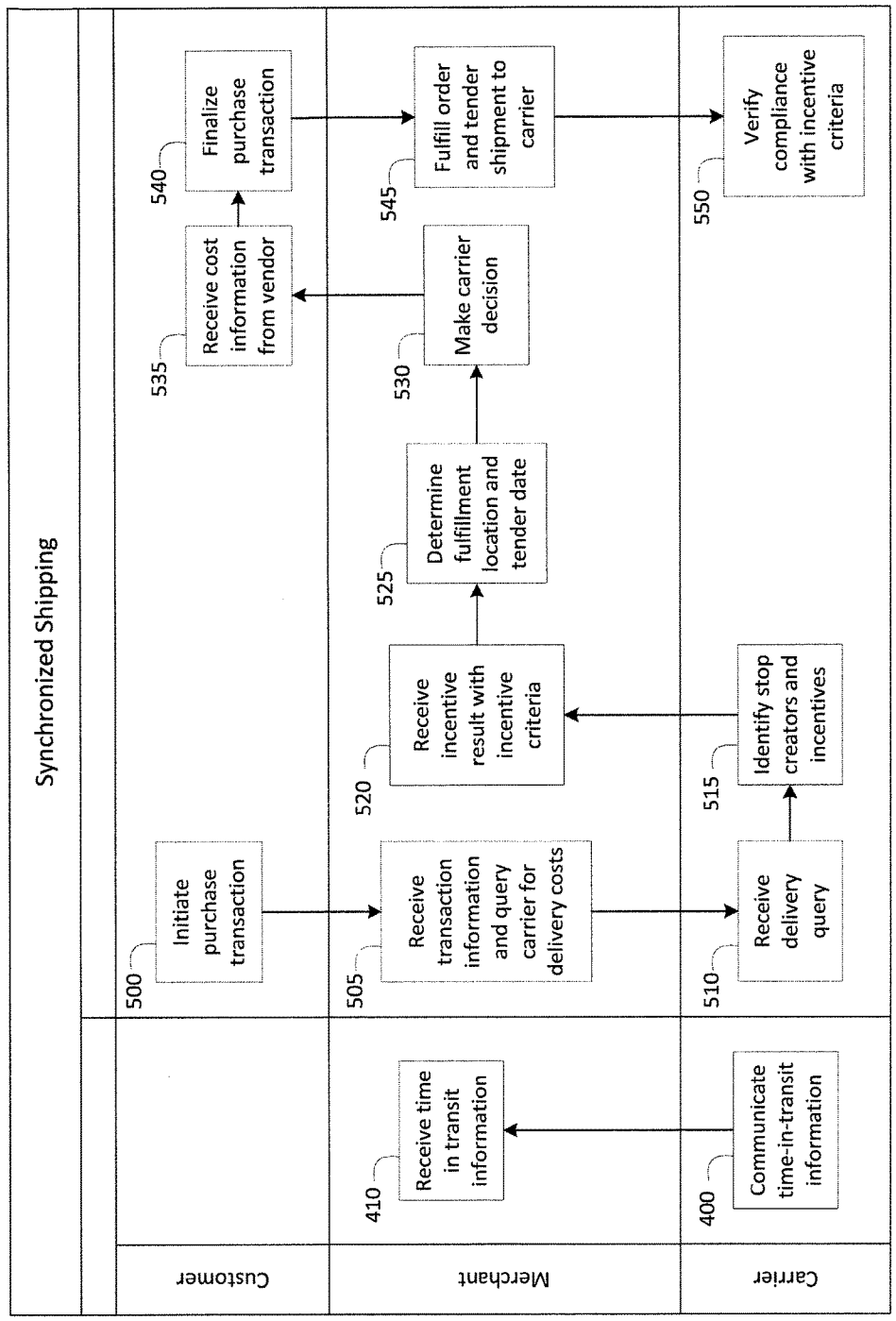
FIG. 5 is diagram illustrating tasks that may be performed by different entities in accordance with various embodiments of the present invention.

FIG. 5 is a "swim lane" diagram illustrating a delivery method according to various embodiments. The process begins at Block 400 with the carrier providing time-in-transit information to the online merchant for one or more fulfillment centers or drop-ship locations, which is received at Block 410. As will be understood by those skilled in the art, many online merchants have multiple fulfillment centers or drop-ship locations distributed throughout a geographic area from which an order may be fulfilled. A carrier may provide time-in-transit information from each fulfillment center or drop-ship location to different geographic areas (e.g., zip codes, cities, states, regions, etc.). Of course, if the online merchant has a single fulfillment center or drop-ship location, time-in-transit information would be provided for that single location. This time-in-transit information may be used by the online merchant to determine a tender date as will be discussed in greater detail below. In various embodiments, the carrier may not provide time-in-transit information for use in incentivizing certain deliveries. For example, the carrier may provide a tendered date as opposed to a delivery date and thus the time-in-transit would be included in the calculation of the tendered date as will be described in greater detail below.

To facilitate a purchase transaction, a customer (e.g., a customer or customer representative operating a customer computing device 108) may access a webpage or portal of an online merchant. For instance, the one or more online merchant servers 106 may transmit a webpage providing the customer with an online store front that allows the customer to browse and select items for purchase. The purchase transaction may be facilitated using a shopping cart or other technique, which allows a customer to accumulate a list of items for purchase. At Block 500, the customer may initiate a purchase transaction by indicating a desire to purchase an item(s). As part of the purchase transaction, the online merchant may request the customer to provide a destination address for the items and may allow the customer to select a delivery service level option such as next day, 2-3 business days, 5-7 business days, etc. In other embodiments, the online merchant may provide multiple delivery dates for selection by the customer.

After the delivery information is received from the customer at Block 505, the online merchant may communicate some or all of the delivery information including the destination address and the promised delivery date information to the carrier. The promised delivery date information may include an actual date or a range of delivery dates. In some embodiments, only the destination address may be provided. The destination address may be provided as a postal address, zip code, landmark identification, a retail store, a restaurant, a latitude and longitude location, a GPS enabled mobile device, or any other technique for identifying a location. The information may be communicated by the one or more online merchant servers 106 to the one or more carrier servers 100 using an Application Programming Interface ("API"), user interface, integrated software, pop-up windows or other communication protocols or paths. In other embodiments, the information may be communicated via text messages (e.g., Short Message Service (SMS) and/or Multimedia Messaging Service (MMS), email messages, voice messages, and/or a variety of other messages in various communication formats.

At Block 510, the carrier receives the shipment information from the online merchant. Using the communicated information, the one or more carrier servers 100 may determine whether synchronized delivery with a stop creator shipment is possible (or probable) and whether to provide a delivery incentive and/or the amount of the incentive to be offered to the online merchant at Block 515.

Figure 6:
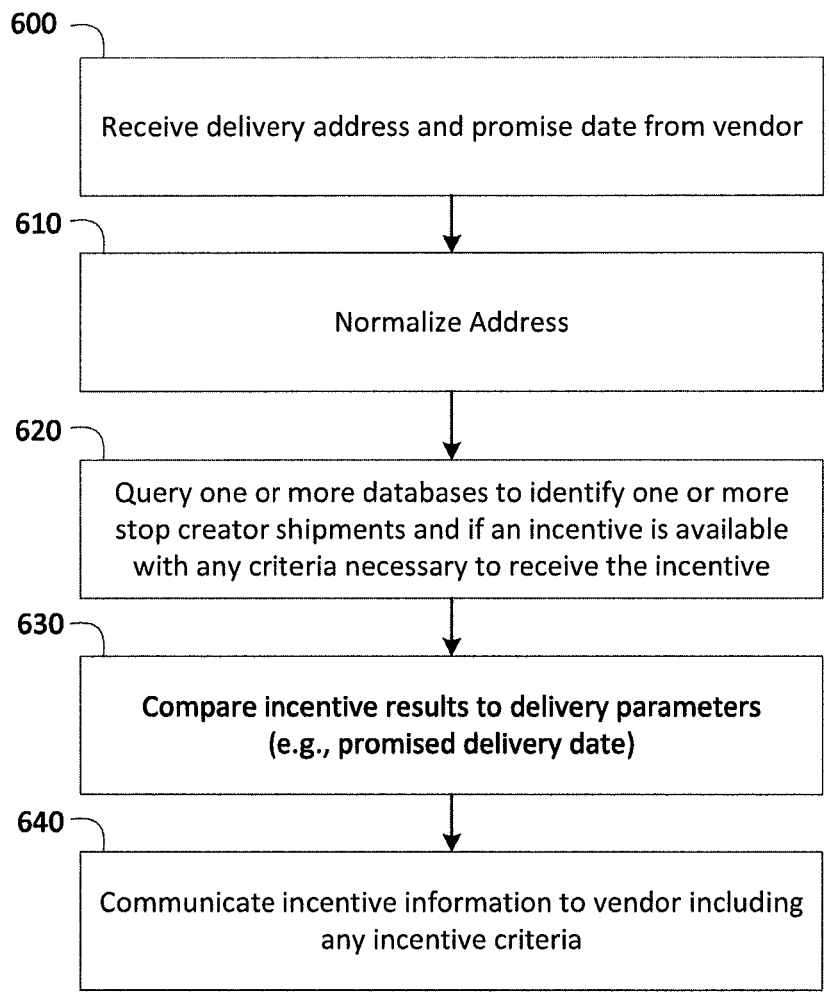
FIG. 6 is a flow diagram illustrating tasks that may be performed in accordance with various embodiments of the present invention.

FIG. 6 provides a flow diagram illustrating the steps that may be performed by the one or more carrier servers 100 to determine whether synchronized delivery with a stop creator shipment is possible (or probable) and whether a delivery incentive is appropriate according to various embodiments. The synchronization/incentive analysis begins at Block 600 with the one or more carrier servers 100 receiving the delivery data from the one or more online merchant servers 106. At Block 610, the one or more carrier servers 100 may normalize the destination address. The normalization process may be implemented using software that corrects errors in the address information (e.g., spelling errors) and adds missing information (e.g., postal information) received from the online merchant. In one embodiment, the one or more carrier servers 100 may maintain a database of ways that a particular address may have been represented in previous shipments (e.g., incorrect capitalization, "Street" versus "St." versus "St", misspellings). These different representations may be linked to a "normalized" address representation. The one or more carrier servers 100 may query this database with the delivery address information received from the online merchant and once a match is found, the linked normalized address is returned.

Using the normalized address, the one or more carrier servers 100 determines whether synchronized delivery with one or more stop creator shipments are possible (or probable) and whether an incentive is appropriate. In various embodiments, the one or more carrier servers 100 may query (a) the historical incentive database (b) the dynamic incentive database and/or (c) a combined historic and dynamic incentive database to determine if an incentive is available at Block 620. The match may be to the actual address or a linked nearby address.

In the event that only the historic incentive database is queried, the one or more carrier servers 100 would determine if an incentive is available for the particular address. In various embodiments, the query result may indicate (a) whether an incentive is available, (b) the type of incentive—address match or nearby address match with an anticipated stop creator shipment, and/or (c) the actual incentive amount.

In the event only the dynamic incentive database is queried, the one or more carrier servers 100 may determine if synchronized delivery with one or more stop creator shipments are possible (or probable) and an incentive is available for the particular address. The one or more carrier servers 100 may also determine delivery criteria that may need to be met to achieve synchronized delivery with the one or more stop creator shipments and to receive the incentive. These delivery criteria may be based on the ability to synchronize the delivery with forecasted deliveries to the particular address or nearby addresses and may include specific delivery dates or ranges of dates.

In the event a combined historic and dynamic incentive database is queried, the one or more carrier servers 100 may determine if synchronized delivery with one or more stop creator shipments are possible (or probable) and if an incentive is available for the particular address. The one or more carrier servers 100 may also determine delivery criteria that may need to be met to achieve synchronized delivery and/or receive the incentive. If the incentive is based on historical data, there may not be any separate delivery criteria necessary to receive the incentive. Alternatively, if the dynamic data is relied upon to identify an incentive, the delivery criteria may be based on the ability to synchronize the delivery with forecasted deliveries to the particular address or nearby addresses (e.g., collectively stop creator shipment(s)) and may include specific delivery dates or ranges of dates.

Alone or in combination with the queries to a historic and dynamic incentive database, the one or more carrier servers 100 may also consider data received from the customer (e.g., a customer profile). This information may include vacation schedules, alternate delivery locations, requested delivery days of the week, etc. Processes that may be used in capturing and storing this type of data is described in Co-pending U.S. patent application Ser. No. 13/174,290, filed Jun. 30, 2011 and entitled "Customer Controlled Management of Shipments," which is incorporated by reference herein in its entirety. This application describes a registration process and operations of various customer delivery programs that may operate in conjunction with embodiments of the present invention.

It should be noted that in various embodiments, the historical incentive analysis and/or dynamic synchronization/incentive analysis may be performed "on the fly" as opposed to querying existing databases. In either case, the one or more carrier servers 100 would access the appropriate raw data (e.g., customer profile data, historical address profile data and/or PLD data, etc.) and apply business rules as generally discussed above with reference to the historical incentive database and the dynamic incentive database to determine if synchronized delivery with one or more stop creator shipments are possible (or probable) and if an incentive is available. The one or more carrier servers 100 may also determine any criteria that must be met to receive the incentive.

Once the synchronization/incentive analysis is performed, the one or more carrier servers 100 may compare the delivery criteria against the promised delivery date(s) provided by the online merchant at Block 630. Using this information, the one or more carrier servers 100 may filter the incentive results to meet the promised date. For example, if the promised delivery date is on or before February 1 and the delivery criteria shows possible incentives for delivery dates of January 29, January 31 and February 3. This comparison would filter out the February 3 date. In the event the delivery information received from the online merchant does not include a promised date, the one or more carrier servers 100 may not perform this step. Instead, all incentive dates identified in the analysis may be provided.

After the synchronization/incentive analysis is performed, the one or more carrier servers 100 may communicate incentive information via an indicator message to the one or more online merchant servers 106 for the received address, which is received by the online merchant at Block 640. The indicator message may be communicated by the one using an API, user interface, integrated software, pop-up windows or other communication protocols or paths. In other embodiments, the information may be communicated via text messages (e.g., Short Message Service (SMS) and/or Multimedia Messaging Service (MMS), email messages, voice messages, and/or a variety of other messages in various communication formats.

In some embodiments, the indicator message may simply indicate an incentive is available, while in other embodiments the indicator message may include the actual incentive (e.g., discount amount, discount percentage, etc.). In further embodiments the indicator message may include delivery criteria that must be met to receive the incentive. For example, the indicator message may indicate a required delivery date or dates required to receive the incentive. The indicator message may also include information associated with the address. The additional information may include reputation information. Further information may include a confirmation of the promise date if initially provided.

In various embodiments, the indicator message may indicate the tendered date(s) and associated tender locations for the shipment to receive the incentive. The tender locations may be fulfillment centers or drop-ship locations for the on-line merchant, drop boxes, or other carrier pick locations. The one or more carrier servers 100 may determine which tender locations to offer based on a variety factors such as, for example, volume in delivery lanes associated with the different locations, time-in-transit, proximity to delivery address, cost associated with the pick-up and the like.

Returning to FIG. 5, the online merchant receives the incentive results from the carrier at Block 520. In the event the indicator message provides one or more delivery dates, the online merchant may then use the time-in-transit information communicated earlier by the carrier to calculate a tender date for the shipment for desired fulfillment centers or drop-ship locations at Block 525. For example, the one or more carrier servers 100 may communicate that a February 1 delivery date is available for an incentive. In conjunction with the time-in-transit information previously provided, the one or more online merchant servers may use the February 1 designation to (a) select a particular fulfillment center or drop-ship location and (b) determine the tender date to the carrier. The fulfillment center may be selected based at least in part on the required delivery service level necessary to meet the February 1 delivery date and the availability of the purchased items at the fulfillment center. Working backwards from the provided delivery date, the online merchant may subtract the previously provided time-in-transit to arrive at the necessary tender date. At this point the online merchant may calculate a shipping cost including the cost associated with the shipping the item from the fulfillment center pursuant to the necessary service level and associated incentive.

At Block 530, the online merchant may use the calculated cost to determine which of multiple different carriers to use for a particular shipment. After making this determination, the online merchant may communicate the shipping cost, among other data, to the customer in anticipation of an order confirmation. This information is received by the customer at Block 535. The customer may then consider the information and finalize the purchase transaction at Block 540.

Once the order is received by the online merchant, the online merchant will fulfill the order and tender the shipment to the carrier at Block 545. In various embodiments, the online merchant may repeat the incentive query after receiving the order to verify the incentive. In some cases, new stop creator shipments may be received between the initial determination and the receipt of the order that may result in a possible synchronization and an incentive. In addition, new stop creator shipments may be received between the initial determination and the determined tender date. In various embodiments, the one or more carriers 100 may periodically (e.g., hourly, daily, etc.) analyze the dynamic data to determine if new stop creator shipments are received. If a new stop creator shipment is identified, the one or more carriers 100 may send a second message to the online merchant indicating the availability of an incentive. In this embodiment, the merchant would not need to continually query the one or more carrier servers 100 to determine if an incentive becomes available. Typically, the one or more carrier servers 100 would periodically analyze the dynamic data if the initial determination was no incentive was available. In some embodiments, however, the carrier may periodically analyze the dynamic data independent of the initial incentive determination.

In various embodiments, the one or more carrier servers 100 may provide a token or unique identifier with the incentive communication to the online merchant for use in identifying the shipment as receiving an incentive. In various embodiments, separate tokens or unique identifiers maybe provided for each available incentive (e.g., delivery dates). In use, the online merchant may include the unique identifier on the label, provide with the PLD information communicated to the carrier or otherwise associate the unique identifier with the shipment. When the shipment is tendered to the carrier, the carrier can then capture the unique identifier and the one or more carrier servers 100 can verify whether the shipment criteria has been met to receive the incentive at Block 550.

d. Incentives

In various embodiments, the carrier may provide a discount for each shipment that meets the incentive criteria. In other embodiments, the carrier may provide a periodic discount for meeting a threshold percentage of shipment criteria (e.g., monthly, quarterly, yearly, etc.). In still further embodiments, the carrier may provide a discount to the online merchant for using the program and further incentives when the threshold criteria are met.

The carrier may periodically report the resulted savings from the program. For example, the carrier may report the gallons of fuel saved, the carbon emissions avoided and the total amount of savings received. In some embodiments, the fuel savings and carbon emissions avoided may be provided for each shipment with the incentive communication. Therefore, the online merchant may communicate this information to the customer (e.g., electrically with the cost information, printed on the label, etc.).

In some embodiments, the incentive may be provided in the form of a rebate or other adjustment after the completion of the shipment. The rebate or other adjustment may be based on the actual synchronization that was achieved versus the anticipated synchronization or lack thereof when the shipment was tendered to the carrier. For example, the shipper may be offered an incentive based on anticipated delivery to a nearby address. Sometime after the shipment is tendered or the incentive is offered, the carrier then receives further shipments to the actual address. Thus, a higher level of match may be made (e.g., direct match with address versus nearby address match) and in this example a higher incentive may be appropriate. The carrier may provide the shipper, consignee or both a rebate or other adjustment for the difference between the incentives. In some embodiments, the rebates or other adjustments may require subscription to a particular service.

d. Merchant Facilitates Synchronized Delivery of Obtain Incentive

In various embodiments, the online merchant may take steps to increase the possibility that a synchronized delivery can be achieved and an associate incentive may be applied. For example, the online merchant may provide multiple addresses with the initial request. In this case, the one or more carrier servers can analyze multiple addresses for possible incentives. The results may include different incentives and/or incentive criteria for the different addresses. In addition, the online merchant may provide information to the carrier regarding other deliveries being considered for the particular address. The carrier may then provide an incentive to deliver both shipments.

e. Customer Facilitates Synchronized Delivery to Obtain Incentive

In various embodiments, the customer (e.g., the consignee) may take steps to increase the possibility that a synchronized delivery can be achieved and an associated incentive may be applied. For example, the customer may have an agreement with the carrier to receive shipments on certain days or at alternative locations. This service may also allow a customer to provide calendar information noting vacation schedules or unavailable dates such that deliveries can be delayed to accommodate the customer's schedule and ability to receive the shipment. Co-pending U.S. patent application Ser. No. 13/174,290, filed Jun. 30, 2011 and entitled "Customer Controlled Management of Shipments," which is incorporated by reference above, describes various systems that allow a customer to designate delivery preferences that may be used in conjunction with embodiments of the present invention. In some embodiments, the customer may pre-authorize the carrier to alter service levels to facilitate delivery on the identified days. For example, the customer may pre-authorize the carrier to alter an overnight delivery service level to a different service level that coincides with delivery of a shipment on a particular day. In some embodiments, rebates may be issued for this change. The one or more carriers 100 may use the calendar information and alternative delivery location information in the synchronization/incentive evaluations noted above. The incentives may be in the form of reduced shipping price or a rebate of a portion of the shipping price. The incentives could be provided to the customer, the online merchant or both.

In some embodiments, the alternate delivery locations may be a landmark, a retail store (affiliated or unaffiliated with the merchant), restaurant, a latitude longitude location, or a GPS location for a customer's car or cellular telephone. Under these circumstances, the carrier may use historic or dynamic data to determine if synchronization with other shipments is possible.

In some embodiments, the carrier may notify the customer that shipments are already en route to their address and provide an incentive to the customer to schedule other shipments for delivery on the same day. In further embodiments, the carrier may provide a list of merchants in which the incentive may apply. In some embodiments, the merchants may pay a subscription to be offered to the customers under this type of scenario, the merchants may be frequent shippers to the consignee or the list may be constructed using other criteria.

It should also be noted that the customer may elect not to participate in the incentive program and thus "opt-out" of the type of incentive services described herein.

f. Synchronize Pickups for Returns

Under certain circumstances, a customer may seek to return a product to an online merchant. Often this requires the customer to access the one or more online merchant servers 106 to obtain a return authorization number. Various embodiments of the present invention may be used to provide incentives to synchronize the pickup of the return item with either a predicted delivery based on historical data or forecasted delivery based on dynamic data. The historic data may include some or all of the delivery address profile data discussed above. The dynamic data may include data for each forecasted shipment such as a ship date, an origin address, destination address, service level, a forecasted delivery date, a unique identifier, and exception information. Using this information, the one or more carrier servers 100 can determine which days a shipment may be anticipated or already forecasted for delivery to the various addresses serviced by the carrier. The online merchant may send a query to the one or more carrier servers 100 to determine if synchronization is possible and whether an incentive is available as noted above. The one or more carrier servers 100 would then analyze the information and provide an indication as to whether an incentive is available.

In further embodiments, returns themselves may be synchronized. Using various data including historic and dynamic data, the one or more carrier servers 100 may determine that the online merchant already has returns forecasted for delivery to a returns center and provide an incentive to synchronize the delivery along with criteria that may be necessary to achieve the synchronization.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for synchronizing delivery of a prospective shipment initiated during a transaction with a merchant via computer-generated rules, the method comprising the steps of:
    establishing synchronization eligibility rules by:
        establishing, in an address database, a plurality of address profiles corresponding to a plurality of addresses, wherein each of the plurality of address profiles comprises one or more profile characteristics applicable to the address profile, wherein the one or more profile characteristics comprise at least one of: (a) a frequency of stops associated with the address corresponding to the address profile, (b) costs associated with making a stop associated with the address corresponding to the address profile, or (c) a reputation associated with the address corresponding to the address profile;
    dynamically generating inter-profile data links within the address database between at least one address profile associated with a specific address and nearby address profiles corresponding to nearby addresses determined to satisfy criteria selected from: (1) being within a distance threshold of the specific address, and (2) being located along a dispatched route shared with the specific address, wherein the inter-profile data links are generated based at least in part on historical data indicative of shipments delivered to each of the plurality of addresses, wherein the historical data comprises data indicative of a historical delivery frequency to each of the plurality of addresses and costs associated with making a stop associated with each of the plurality of addresses; and establishing the synchronization eligibility criteria for shipments destined to respective addresses linked via one or more inter-profile data links;

applying the synchronization eligibility rules for a prospective shipment via a shipment database, wherein applying the synchronization eligibility rules comprises:

receiving shipping information from a merchant computing system during the transaction in real time, via a computer system, for the prospective shipment, wherein the shipping information includes a destination address specified during the transaction with the merchant;

querying the address database to retrieve a certain address profile associated with the destination address and one or more synchronization eligibility rules, wherein the synchronization eligibility rules comprise at least one profile characteristic stored in address profiles corresponding to each of the linked nearby addresses;

automatically generating a query for the shipment database based at least in part on the synchronization eligibility rules to retrieve shipping data indicative of stop creator shipments forecasted for delivery to at least one of the linked nearby addresses;

determining, based at least in part on the at least one profile characteristic of the certain address profile and the one or more nearby address profiles corresponding to nearby addresses for which delivery of a stop creator shipment is forecasted, whether the prospective shipment satisfies one or more criteria; and sending an indicator message to the merchant indicating one or more tender dates in which the prospective shipment satisfies the one or more criteria.

2. The method of claim 1, wherein the synchronization eligibility rules comprise a threshold frequency of stops.

3. The method of claim 1, wherein the synchronization eligibility rules relate to the reputation associated with an address or nearby addresses.

4. The method of claim 1, wherein the frequency of stops includes pickups and deliveries associated with an address or nearby addresses.

5. The method of claim 1 further comprising the steps of:
comparing the destination address to dynamic delivery data relating to the destination address or the nearby addresses;
identifying dates in which one or more of the stop creator shipments are forecasted for delivery to the destination address or the nearby addresses; and
determining, based at least in part on the one or more stop creator shipments if the prospective shipment satisfies a criteria.

6. The method of claim 5, wherein the indicator message comprises delivery criteria for qualifying for an incentive.

7. The method of claim 6, wherein the delivery criteria comprises one or more delivery dates related to the one or more stop creator shipments.

8. The method of claim 6, wherein the delivery criteria comprises one or more tender dates.

9. The method of claim 1, wherein the nearby addresses share at least one similarity with the address selected from the group consisting of: the same street, the same neighborhood, or the same building.

10. A computer-implemented method for synchronizing delivery of a prospective shipment initiated during a transaction with a merchant, the method comprising the steps of:
receiving shipping information from the merchant during the transaction, via a computer system, for a prospective shipment, wherein the shipping information includes a destination address specified during the transaction with the merchant;
establishing synchronization eligibility rules for identifying shipments eligible for synchronized delivery by:
querying an address database comprising a plurality of address profiles, based on the information identifying the destination address to identify one or more nearby addresses, wherein the one or more nearby addresses are identified based at least in part on dynamically-generated inter-profile data links between address profiles identified as meeting criteria selected from: (1) being within a distance threshold of the destination address, and (2) being located along a dispatched route shared with the destination address; and
establishing the synchronization eligibility criteria for shipments destined to respective addresses linked via one or more inter-profile data links;
querying a dynamic shipment database comprising dynamic data corresponding to one or more forecasted shipments to identify dynamic data corresponding to one or more stop creator shipments identified based at least in part on the synchronization eligibility criteria and that are forecasted for delivery to at least one of the destination address or nearby addresses, wherein the dynamic data for each of the one or more stop creator shipments identifies a date on which each of the one or more of the stop creator shipments are forecasted for delivery to the destination address or the nearby addresses;
determining, based at least in part on the identified dynamic data corresponding to the one or more stop creator shipments if the prospective shipment satisfies the synchronization eligibility criteria;
determining, based at least in part on the identified dynamic data and the destination address for the prospective shipment, one or more tender dates and corresponding shipping criteria for the prospective shipment to be delivered concurrently with one or more of the stop creator shipments; and
sending an indicator message to the merchant indicating the one or more tender dates and corresponding shipping criteria in which the prospective shipment satisfies the one or more criteria.

11. The method of claim 10, wherein the indicator message comprises delivery criteria for qualifying for an incentive.

12. The method of claim 11, wherein the delivery criteria comprises one or more delivery dates related to the one or more stop creator shipments.

13. The method of claim 11, wherein the delivery criteria comprises one or more tender dates.

14. The method of claim 10, wherein the stop creator shipments comprise pickups and deliveries to the associated address.

15. The method of claim 10, wherein the nearby addresses share at least one similarity with the destination address selected from the group consisting of:
the same street, the same neighborhood, or the same building.

16. An apparatus comprising at least one processor and at least one memory including computer program code, the at least one memory and the computer program code configured to, with the processor, cause the apparatus to at least:
establish synchronization eligibility rules by:

establishing, in an address database, a plurality of address profiles corresponding to a plurality of addresses, wherein each of the plurality of address profiles comprises one or more profile characteristics applicable to the address profile, wherein the one or more profile characteristics comprise at least one of: (a) a frequency of stops associated with the address corresponding to the address profile, (b) costs associated with making a stop associated with the address corresponding to the address profile, or (c) a reputation associated with the address corresponding to the address profile;

dynamically generating inter-profile data links within the address database between at least one address profile associated with a specific address and nearby address profiles corresponding to nearby addresses determined to satisfy criteria selected from: (1) being within a distance threshold of the specific address, and (2) being located along a dispatched route shared with the specific address, wherein the inter-profile data links are generated based at least in part on historical data indicative of shipments delivered to each of the plurality of addresses, wherein the historical data comprises data indicative of a historical delivery frequency to each of the plurality of addresses and costs associated with making a stop associated with each of the plurality of addresses; and establishing the synchronization eligibility criteria for shipments destined to respective addresses linked via one or more inter-profile data links;

apply the synchronization eligibility rules for a prospective shipment via a shipment database, wherein applying the synchronization eligibility rules comprises:

receiving shipping information from a merchant computing system during a transaction for initiating a prospective shipment, via a computer system, for the prospective shipment, wherein the shipping information includes a destination address specified during the transaction with the merchant;

querying the address database to retrieve a certain address profile associated with the destination address and one or more synchronization eligibility rules, wherein the synchronization eligibility rules comprise at least one profile characteristic stored in address profiles corresponding to each of the linked nearby addresses;

automatically generating a query for the shipment database based at least in part on the synchronization eligibility rules to retrieve shipping data indicative of stop creator shipments forecasted for delivery to at least one of the linked nearby addresses;

determine, based at least in part on the at least one profile characteristic of the certain address profile and the one or more nearby address profiles corresponding to nearby addresses for which delivery of a stop creator shipment is forecasted, whether the prospective shipment satisfies one or more criteria; and send an indicator message to the merchant indicating one or more tender dates in which the prospective shipment satisfies the one or more criteria.

17. The apparatus of claim 15, wherein the one or more synchronization eligibility rules comprise a threshold frequency of stops to qualify for an incentive.

18. The apparatus of claim 16, wherein the one or more synchronization eligibility rules relate to the reputation associated with an address or nearby addresses.

19. The apparatus of claim 16, wherein the frequency of stops includes pickups and deliveries associated with an address or nearby addresses.

20. The method of claim 16, wherein the shipping information includes a requested delivery date range and wherein the memory and computer program code are further configured to, with the processor:

compare the destination address to dynamic data relating to deliveries forecasted for delivery to the destination address or nearby address;

identify dates in which one or more stop creator shipments are forecasted for delivery to the destination address or the nearby addresses on or before the requested delivery date range; and determine, based at least in part on the one or more stop creator shipments if the prospective shipment satisfies one or more criteria.

21. The apparatus of claim 20, wherein the indicator message comprises delivery criteria for qualifying for an incentive.

22. The apparatus of claim 21, wherein the delivery criteria comprises one or more delivery dates related to the one or more stop creator shipments.

23. The apparatus of claim 21, wherein the delivery criteria comprises one or more tender dates.

24. The apparatus of claim 16, wherein the nearby addresses share at least one similarity with the address selected from the group consisting of: the same street, the same neighborhood, or the same building.

25. An apparatus comprising at least one processor and at least one memory including computer program code, the at least one memory and the computer program code configured to, with the processor, cause the apparatus to at least:

receive shipping information from a merchant during a transaction initiating a prospective shipment, via a computer system, for the prospective shipment, wherein the shipping information includes a destination address;

establish synchronization eligibility rules for identifying shipments eligible for synchronized delivery by:

querying an address database comprising a plurality of address profiles, based on the information identifying the destination address to identify one or more nearby addresses, wherein the one or more nearby addresses are identified based at least in part on dynamically-generated inter-profile data links between address profiles identified as meeting criteria selected from: (1) being within a distance threshold of the destination address, and (2) being located along a dispatched route shared with the destination address; and establishing the synchronization eligibility criteria for shipments destined to respective addresses linked via one or more inter-profile data links;

query a dynamic shipment database comprising dynamic data corresponding to one or more forecasted shipments to identify dynamic data corresponding to one or more stop creator shipments identified based at least in part on the synchronization eligibility criteria and that are forecasted for delivery to at least one of the destination address or nearby addresses, wherein the dynamic data for each of the one or more stop creator shipments identifies a date on which each of the one or more of the stop creator shipments are forecasted for delivery to the destination address or the nearby addresses on or before the requested delivery date range;

determine, based at least in part on the identified dynamic data corresponding to the one or more stop creator shipments if the prospective shipment satisfies the synchronization eligibility criteria;

determine, based at least in part on the identified dynamic data and the destination address for the prospective shipment, one or more tender dates and corresponding shipping criteria for the prospective shipment to be delivered concurrently with one or more of the stop creator shipments; and send an indicator message to the merchant indicating the one or more tender dates and corresponding shipping criteria in which the prospective shipment satisfies the one or more criteria.

26. The apparatus of claim 25, wherein the indicator message comprises delivery criteria for qualifying for an incentive.

27. The apparatus of claim 26, wherein the delivery criteria comprises one or more delivery dates related to the one or more stop creator shipments.

28. The apparatus of claim 26, wherein the delivery criteria comprises one or more tender dates.

29. The method of claim 26, wherein the stop creator shipments comprise pickups and deliveries to the destination address or the nearby addresses.

30. The apparatus of claim 25, wherein the nearby addresses share at least one similarity with the destination address selected from the group consisting of:

the same street, the same neighborhood, or the same building.

\* \* \* \* \*

UNITED STATES PATENT AND TRADEMARK OFFICE
CERTIFICATE OF CORRECTION

PATENT NO. : 10,163,119 B1
APPLICATION NO. : 13/828652
DATED : December 25, 2018
INVENTOR(S) : Chris Bolton et al.

Page 1 of 1

It is certified that error appears in the above-identified patent and that said Letters Patent is hereby corrected as shown below:

In the Specification

Column 08, Line 67: Please remove "provide" and replace with --provided--.

In the Claims

Column 20, Line 63: Please remove "apparatus" and replace with --method--.

Signed and Sealed this
Fifth Day of February, 2019

Andrei Iancu
*Director of the United States Patent and Trademark Office*